US006957111B2

(12) United States Patent  (10) Patent No.: US 6,957,111 B2
Zhu et al.  (45) Date of Patent: Oct. 18, 2005

(54) AUTOMATED SYSTEM FOR COOKING AND METHOD OF USE

(75) Inventors: Liang Zhu, Palo Alto, CA (US); Richard Bryan Sagar, Santa Clara, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 965 days.

(21) Appl. No.: 09/938,386

(22) Filed: Aug. 24, 2001

(65) Prior Publication Data

US 2003/0037681 A1     Feb. 27, 2003

(51) Int. Cl.⁷ .............................................. G06F 17/00
(52) U.S. Cl. ........................... 700/90; 700/12; 700/14; 700/16; 700/83; 99/327; 99/348; 99/473; 219/620; 379/102.05; 379/102.02; 426/87; 426/459
(58) Field of Search .............................. 700/11, 12, 14, 700/16, 83, 90; 99/327, 328, 348, 473; 219/620; 379/102.02, 102.05; 426/87, 459

(56) References Cited

U.S. PATENT DOCUMENTS

| | | | |
|---|---|---|---|
| 4,550,653 A | 11/1985 | Hedenberg | 99/348 |
| 4,665,544 A * | 5/1987 | Honda et al. | 379/102.03 |
| 4,803,086 A | 2/1989 | Hedenberg | 426/87 |
| 5,017,395 A | 5/1991 | McCaskill et al. | 426/459 |

(Continued)

OTHER PUBLICATIONS

Here We Go Again, www.controleng.com/achives/2000/ct101 01.00/00100wl.htm.

(Continued)

Primary Examiner—Leo Picard
Assistant Examiner—Douglas S. Lee
(74) Attorney, Agent, or Firm—Kevin Fortin

(57) ABSTRACT

The present invention comprises an improved device and method for automated cooking foods with a liquid such as water. In a preferred embodiment, the system comprises a cooking chamber (46); a controller (20); a residential home gateway server (10) comprising a memory and a communications interface operatively connected to the controller (20) and to the Internet (104); a hopper (42) for containing food; a stopper (44) in communication with the cooking chamber (46) and the hopper (42), the stopper (44) operatively connected to and selectively controllable by the controller (20) to provide a predetermined portion of the food from the hopper (42) into the cooking chamber (46); the stopper having at least one position in which it is sealingly engaged against the cooking chamber (46) and the hopper (42) to prevent steam generated by the cooking process from entering into the hopper (42) during cooking; a conduit (30) in communication with the cooking chamber (46) for providing liquid into the cooking chamber (46); and a valve (32) disposed intermediate the conduit (30) and the cooking chamber (46) and operatively connected to and selectively controllable by the controller (20). The method comprises receiving data from a remote source, the data comprising a desired amount of servings of the food and a starting time for preparation of the food; determining the cooking characteristics of the food, comprising liquid needs for the food and cooking time; providing food into the cooking chamber (46) from the hopper (42) in a quantity sufficient to satisfy the desired servings; providing liquid into the compartment from the conduit (30) sufficient to satisfy liquid requirements of the food for the number of serving requirements; and engaging a cooking element accessible to the cooking chamber (46) sufficient to satisfy cooking time requirements for the desired number of servings.

25 Claims, 3 Drawing Sheets

U.S. PATENT DOCUMENTS

| | | | | |
|---|---|---|---|---|
| 5,146,840 | A | 9/1992 | Hedenberg | 99/328 |
| 5,386,102 | A | 1/1995 | Takikawa et al. | 21/620 |
| 5,421,713 | A | 6/1995 | Backus et al. | 425/209 |
| 5,512,733 | A | 4/1996 | Takikawa et al. | 219/620 |
| 5,600,711 | A | 2/1997 | Yuen | 379/102 |
| 5,619,614 | A | 4/1997 | Payne et al. | 395/3 |
| 5,743,173 | A | 4/1998 | Hayashi et al. | 99/331 |
| 5,915,026 | A * | 6/1999 | Mankovitz | 713/168 |
| 5,947,009 | A | 9/1999 | Hedenberg | 99/348 |
| 5,967,021 | A | 10/1999 | Yung | 99/327 |
| 5,967,023 | A | 10/1999 | Acknin et al. | 99/348 |
| 6,082,251 | A | 7/2000 | Kendall et al. | 99/473 |
| 6,196,113 | B1 | 3/2001 | Yung | 99/327 |
| 6,502,411 | B2 * | 1/2003 | Okamoto | 62/129 |
| 6,549,818 | B1 * | 4/2003 | Ali | 700/90 |
| 6,751,508 | B2 * | 6/2004 | Sasaki et al. | 700/1 |
| 6,792,323 | B2 * | 9/2004 | Krzyzanowski et al. | 700/90 |
| 6,862,494 | B2 * | 3/2005 | Hu et al. | 700/211 |
| 6,873,876 | B1 * | 3/2005 | Aisa | 700/86 |
| 6,887,739 | B2 * | 5/2005 | Fujisawa et al. | 438/110 |
| 6,892,545 | B2 * | 5/2005 | Ishikawa et al. | 62/126 |

OTHER PUBLICATIONS

Re: Remote control of domestic applicances, www.anu.edu.au/mail-archives/link/link9806/0251.html.

Remote control of domestic applicances, www.anu.edu.au/mail-archives/link/link9806/0173.html.

UK Football trouble brewing for National Grid, www.news.bbc.co.uk/hi/english/uk/newsid 109000/109355.stm.

Appliances with Internet Capability, www.membersozemail.com.au/adshar/news.html.

World Tour: Confortec 2000 Appliances of the Future, www.appliancesmagazine,com/mm/wt/html/body confortec 2000 p10.html.

Intelligent ovens with surf the net, www.dispatch,co.za/1998/10/03/foreign/OVEN.HTM.

Human Engineering Technology to Evaluate Usability of Appliance Interface of Aging Society, www.osakagas.co.jp/rd/sheet/093e.htm.

Internet ovens and refrigerators are on the horizon, www.augustachronicle.com/stories/100198/tec 124-3962.shtml.

Mainland focuses on Internet models, www.kitchentableware.globalsources.com/MAGAZINE/0101/PKITA PCH.H.

Hypertext Coffee Pot Control Protocol (HTCPCP/1.0), www.coffeetea.about.com/food/coffeetea/library/weekly/blhypertextcoffee.htm.

Hypertext Coffee Pot Control Protocol (HTCPCP/1.0), www.coffeetea.about.com/food coffeetea/library/weekly/blhypertextcoffee2.htm.

Hypertext Coffee Pot Control Protocol (HTCP/1.0) , www.coffeetea.about.com/food/coffeetea/library/weeklyblhypertexcoffee3.htm.

Hypertext Coffee Pot Control Protocol (HTCPCP/1.0), www.coffeetea.about.com/food/coffeetea/library/weekly/blhypertextcoffee4.htm.

Hypertext Coffee Pot Control Protocol (HTCPCP/1.0), www.coffeetea.about.com/food/coffeetea/library/weekly/blhypertextcoffee5.htm.

Hypertext Coffee Pot Control Protocol (HTCPCP/1.0), www.coffeetea.about.com/food/coffeetea/library/weekly/blhypertextcoffee6.htm.

Re: Remote control of domestic appliances, www.anu.edu.au/mail-archives/link/link9806/0184.html.

Tomorrow'kitchen: Cooking up food and information, www.sptimes.com/News/62199/Technology/Tomorrows kitchen: C.shtml.

U.S. Appl. No. 09/427,821, PHA23, 786, PDA Has Wireless Modem for Remote Control Via the Internet.

U.S. Appl. No. 09/715,364, US 0008064, Intelligent Appliance Home Network.

* cited by examiner

AUTOMATED SYSTEM FOR COOKING AND METHOD OF USE

BACKGROUND OF THE INVENTION

1. Field of the Invention

The present invention relates to the field of cooking appliances. More specifically, the present invention, in an exemplary embodiment, relates to a cooking appliance for cooking a material requiring a liquid such as water, the appliance comprising a hopper for containing the material and a source of the liquid where cooking the material is automated under the control of a controller. More specifically still, the present invention, in an exemplary embodiment, relates to a cooking appliance such as a rice cooker where cooking the rice is automated under the control of a controller that may be remotely programmed such as by using an Internet browser.

2. Description of the Related Art

It has been speculated, in the prior art, that in the future homes will contain automation and intelligent appliances. Such home automation systems may allow people to engage their house as an active partner such as by using automated house components under the control of one or more controllers. These controllers may be linked together in many ways as will be readily apparent to those of ordinary skill in the computer arts, by way of example and not limitation using semi-autonomous processors, central controllers, and the like. A controller may receive signals from controlling input devices and use those signals to control relevant appliances and systems in the house.

Controlled devices in a prior art home automation system are typically assigned distinct addresses so that when a signal is sent such as through power lines, only those switches and receptacles with the designated address will respond while others will ignore it. One such method uses X-10 protocols, which are protocols that may be used in power line communication technology. X-10 protocols may be used to communicate a range of controls, namely ON, OFF, DIM, BRIGHT, ALL LIGHTS ON and ALL UNITS OFF. More complex operations often require a plurality of X-10 controllers.

The simplest X-10 transmitter is a control box with buttons, not unlike a typical prior art remote control. When pressed, the X-10 controller's buttons provide for signaling a specific unit to be controlled and additionally indicate which control function is to be communicated. The X-10 controller may comprise clock timers, preset to transmit at specific times or triggered under special, recognizable circumstances such as sunrise or sunset, or movement. The simplest X-10 receiver is a small module with an electric plug that is hooked on to a standard wall outlet to create a "smart receptacle" that provides controlled power to any device that is connected to it.

Additionally, alternative products such as the CEBus manufactured by GE-Smart, a joint venture of GE Industrial Systems of Fairfield, Conn. and SMART of Las Cruces, N. Mex. (http://www.ge-smart.com) and LonWorks manufactured by Echelon Corporation of Sunnyvale, Calif. (http://www.ecehlon.com) provide additional protocol support that can be used with or as an alternative to X-10 technology. Numerous appliance vendors such as Philips Electronics have also contributed to a standard that will allow to link all of a home's electrical appliances into a single network. The standard may allow appliances such as computers, televisions, stereos and other electrical appliances to communicate with one another, such as by using TCP/IP protocols to provide appliances with an "Internet address."

By way of example and not limitation, U.S. Ser. No. 09/715,364, filed Nov. 17, 2000 for Pieter van der Meulen ("van der Meulen '064")), for an INTELLIGENT APPLIANCE HOME NETWORK, fully incorporated by reference herein, describes a set of consumer devices that can be used in automated home systems. Systems comprising automated and intelligent appliances may incorporate alarm systems as well as status monitors and controllers for lights, motors, or appliances. Intelligent appliances may further provide mechanisms for bi-directional communications including the ability to receive commands and transmit status alerts.

Some manufacturers have begun marketing intelligent appliances such as Ariston Digital appliances manufactured by Merloni Electtrodomestisci of Italy. One such appliance by Merloni Electtrodomestisci is an "intelligent oven" comprising remote-control cooking programs and built-in Internet access for recipes.

Additionally, various systems and methods are known for automating some of the cooking process. U.S. Pat. No. 5,421,713 to Backus et al. for a "Pasta, Pastry, Cookie and Hors D'oeuvre Maker" teaches a device having an automatic measuring cup that can mix and extrude various ingredients including pastas and the like. U.S. Pat. No. 5,967,023 to Acknin et al. for a "Mechanized Food Manufacturing Process" teaches a device for manufacturing foods using food materials held in specific sachets. Some patents teach the use of dry food ingredients contained in a bag for further processing, such as U.S. Pat. No. 4,550,653 to Hedenberg, U.S. Pat. No. 5,146,840 to Hedenberg, U.S. Pat. No. 4,803,086 to Hedenberg, and U.S. Pat. No. 6,196,113 to Yung.

Additionally, some publications also teach use of data communications such as over a telephone connection to initialize an appliance. U.S. Pat. No. 5,600,711 to Yuen is illustrative.

None of the publications teaches or suggests an appliance that has access to cooking materials, such as rice or pasta as well as a liquid such as water, under the control of, e.g., a residential home gateway server, to automatically deliver user-selected portions of the food material and liquid to a cooking area. None of the publications teaches or suggests an appliance that has access to a residential home gateway server where the residential home gateway server is in communication with a remote device for entering information comprising servings requested and time of day to start preparation. None of the publications teaches or suggests an automatic cooking device capable of automatically retrieving and preparing food on a per serving basis. None of the publications teaches or suggests an automatic cooking device capable of automatically retrieving and preparing food on a per serving basis after receiving instructions to do so from a remote device such as a remote controller, a computer, or via the Internet.

BRIEF DESCRIPTION OF THE DRAWINGS

These and other features, aspects, and advantages of the present invention will become more fully apparent from the following description, appended claims, and accompanying drawings in which:

DETAILED DESCRIPTION OF THE PREFERRED EMBODIMENT

In general, throughout this description, if an item is described as implemented in software, it can equally well be implemented as hardware.

Figure 1:
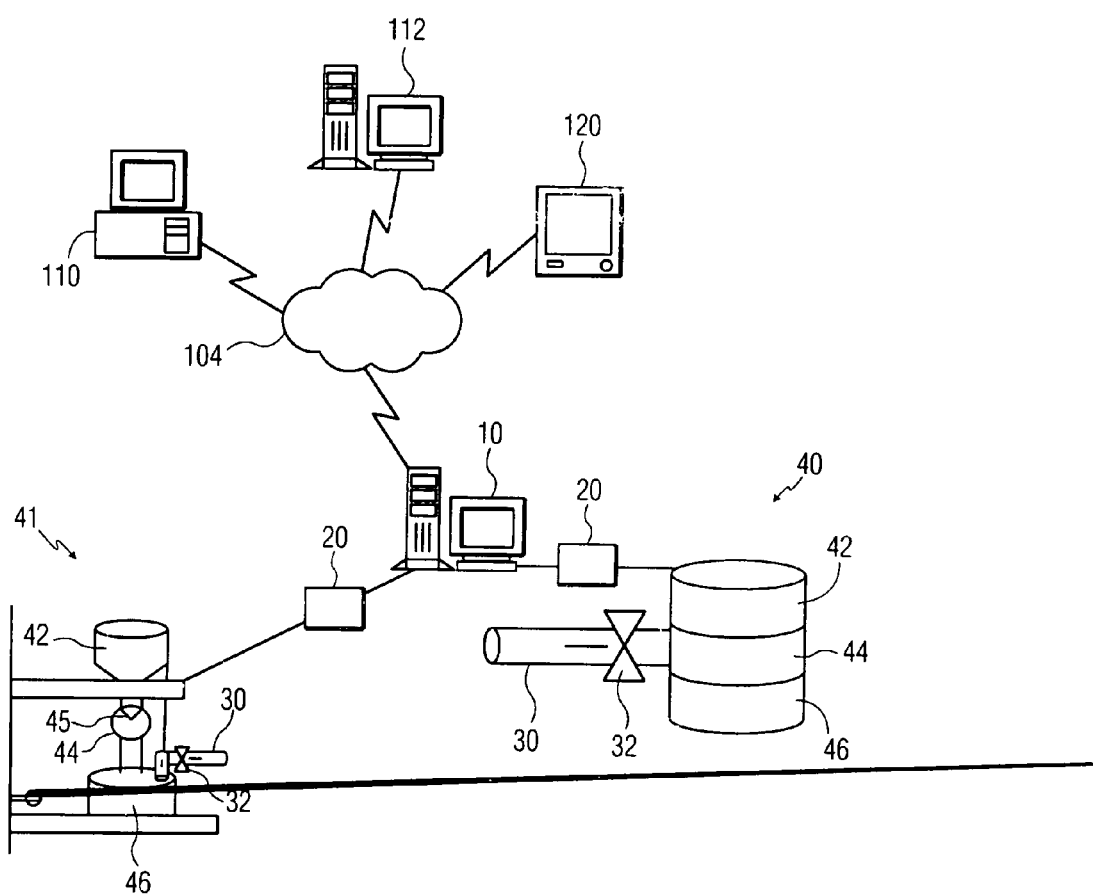
FIG. 1 is a schematic of an exemplary system configuration of the present invention.

Referring now to FIG. 1, an exemplary configuration of the present invention is shown at 40. Hopper 42 is a container for food material to be prepared using a liquid such as water, by way of example and not limitation including rice, cereal grains, pasta, coffee, dried foods such as soups, and the like. Stopper 44 is controllable to allow the food material in hopper 42 to selectively pass into cooking chamber 46. In a first position, stopper 44 maintains a seal between hopper 42 and cooking chamber 46. In a second position, stopper 44 allows a predetermined amount of the food material to pass between hopper 42 and cooking chamber 46.

In a preferred embodiment, the food material is placed into hopper 42 in bulk. In a currently envisioned embodiment, as illustrated by legacy add-on 41, stopper 44 comprises receiver 45 which comprises a chamber interior to stopper 44 adapted to receive a predetermined amount of the food material from hopper 42. In this embodiment, stopper 44 is a rotatable member that receives a predetermined amount of the food as receiver 45 comes into communication with hopper 42. As stopper 44 continues to rotate, receiver 45 fills up with the food material. As stopper 44 continues to rotate, food material is trapped in receiver 45 while a non-receiving portion of stopper 44 seals against hopper 42 and blocks further receipt of the food material from hopper 42. As stopper 44 continues to rotate, receiver 45 comes into communication with cooking chamber 46 and the food material is released from receiver 45 into cooking chamber 46. As stopper 44 rotates farther, stopper 44 additionally seals against cooking chamber 46. In a preferred embodiment, when cooking begins, stopper 44 remains sealing engaged against hopper 42 and cooking chamber 46 so that steam generated from the cooking process is prevented from entering into hopper 42.

In alternative currently envisioned embodiments, stopper 44 may be timed to allow the predetermined amount of food material to pass based on the time stopper 44 remains in its open second position. In a further embodiment, food material in hopper 42 may already be in predetermined portion sizes such as by packaging. In a further embodiment, stopper 44 may be of a corkscrew type feeding device as is known in the prior art.

Conduit 30 extends from a source of liquid (not shown in the figures) such as a water lines or water bottle or the like into cooking chamber 46. Valve 32 is disposed intermediate conduit 30 and cooking chamber 46 and is selectively controllable to allow liquid to pass from the source of liquid into cooking chamber 46. In an additionally contemplated embodiment, conduit 30 may be positioned so as to flush food material from stopper 44 after stopper 44 has provided food material to cooking chamber 46.

In currently envisioned embodiments, the present invention may further comprise support 48 to provide support for hopper 42 when it contains food material of such weight that hopper 42 might lose balance.

Residential home gateway server 10 may be situated intermediate a local residential home network and the Internet 104 and be operatively in communication with one or more controllers 20. In the preferred embodiment, residential home gateway server 10 is also operatively in communication with the Internet 104 and comprises a unique universal resource locator ("URL") or internet protocol ("IP") address. In a preferred embodiment, residential home gateway server 10 is a personal computer but can be a dedicated processor or any equivalent as will be readily familiar to those of ordinary skill in the computer and appliance control arts. Residential home gateway server 10 may accept commands submitted to it through the Internet 104 such as via an Internet browser. Additionally, residential home gateway server 10 may also be able to send commands to control controller 20.

In the preferred embodiment, a security software module executable within residential home gateway server 10 handles authorization and authentication. After accepting the commands sent by a user with proper authorization, residential home gateway server 10 stores information about start and stop times for cooking, numbers of servings of the food material desired, and the like to enable control of controllers 20 that can be controlled by residential home gateway server 10. The user can therefore remotely program cooking appliances 40,41 by submitting commands to residential home gateway server 10 by using an Internet browser that can reside in such as a computer, a personal digital assistant ("PDA") or a Wireless Access Protocol ("WAP") mobile phone with Internet access capability, or a cell phone to interact with a pre-programmed menu for the appliance through key selection at the phone's keypad, etc.

Controller 20 may control stopper 44, valve 32, and cooking chamber 46 by means well known to those in the control arts, by way of example and not limitation including stepper motors, X10 modules, and timers. In additional embodiments, controller 20 may comprise a plurality of controllers 20, including controllers 20 embedded in cooking device 40 or cooking add-on 41. In the preferred embodiment, X10 modules are used for the communications between residential home gateway server 10 and controllers 20.

By way of example and not limitation, an X10 interface module may be attached to controller 20. A controller 20 such as an X10 CM11A two-way controller may serve as the communication message relay between residential home gateway server 10 and other X10 modules. By way of example and not limitation, an X10 universal module in momentary mode may be attached to controller 20. In momentary mode, the X10 universal module provides contact closure switching, e.g. the contacts may close for two seconds when an ON signal is received. The contact closure switching will provide the triggering signal to controllers 20 as will be readily apparent to those of ordinary skills in the control arts. Software executing in residential home gateway server 10 translates the number of servings of the food desired into an appropriate number of ON commands that will be sent to the X10 universal module. For example, if the number of food servings is four, residential home gateway server 10 sends out consecutively four ON commands following the X10 protocol format to the attached X10CM11A interface. The X10 CM11A interface then relays the commands via power lines to the X10 universal module that is attached to the appropriate controller 20. Each time the X10 universal module in momentary mode receives the ON command, it will trigger controller 20 to rotate stopper 44 for a full cycle. In this manner, one serving of the food material is fetched from hopper 42 and put into cooking chamber 46 per cycle.

Residential home gateway server 10 receives instructions from a user inputting instructions either at residential home gateway server 10 or from a remote input device. In a currently preferred embodiment, residential home gateway server 10 is operatively connected to the Internet 104 and may receive instructions from remote input devices such as from a remote user using a computer such as at 110 or a remote user using a hand-held device such as a Palm™ manufactured by Palm Inc., a wireless internet device, or a WAP mobile phone, a cell phone, etc., shown at 120. Additionally, other remote devices may be used such as television remote controls as described in van der Meulen '064 or in U.S. Ser. No. 09/427,821(attorney docket PHA 23,786, filed Oct. 27, 1999 for Joost Kemink and Rik Sagar) for a PDA HAS WIRELESS MODEM FOR REMOTE CONTROL VIA THE INTERNET, fully incorporated by reference herein. Communication such as between residential home gateway server 10 and remote devices or residential home gateway server 10 and controller 20 may be accomplished by communications methods that will be readily familiar to those of ordinary skill in the computer communications arts, by way of example and not limitation including local area networks, wide area networks, wireless networks, wired networks, and the like, or any combination thereof. The communication interface between residential home gateway 10 and the Internet 104 can be by any of numerous methods as will be readily familiar to those of ordinary skill in the data communications arts, by way of example and not limitation including phone line dial up modems, cable modem, ATM interfaces, ISDN lines, and xDSL interfaces. As will also be readily familiar to those of ordinary skill in the data communications arts, the communication interface for the local home network can be wired such as by power line, phone line, USB cable, or Ethernet cables or can be wireless such as by radio frequency such as BLUETOOTH™ or infrared.

As is described in van der Meulen '064, residential home gateway server 10 may receive feedback information regarding the present invention. By way of example and not limitation, in a currently preferred embodiment, feedback may be provided via the measurements of physical characteristics such as fluid pressure in conduit 30, humidity in cooking chamber 46, or the weight of the food material in hopper 42, e.g. if there is no water then controller 20 will be signaled to immediately stop the cooking process. By way of further example and not limitation, when the cooking is done or if a problem occurs, controller 20 can send the user pertinent information such as in the form of an HTML page to the user's web browser, an e-mail message to the user's e-mail box, a short numerical message to the user's pager or mobile phone, a short vocal message to the user's phone message box or mobile phone, or the like, or a combination thereof.

Figure 2:
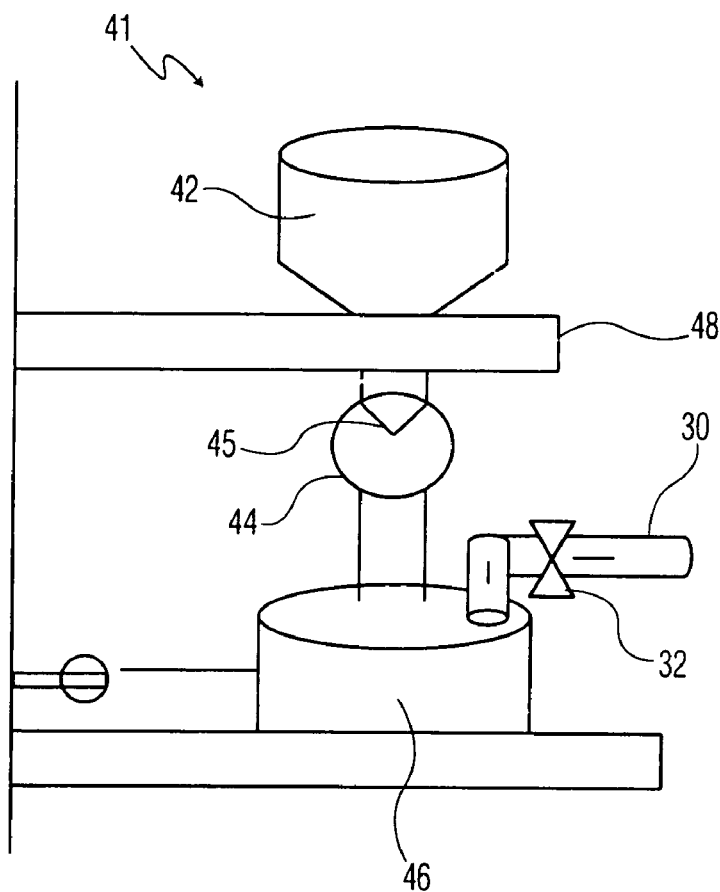
FIG. 2 is a schematic of an exemplary configuration of an adaptation of the present system of the present invention for a legacy cooking device.

In the currently preferred embodiment, cooking device 40 is an integrated unit comprising hopper 42, stopper 44, cooking chamber 46, conduit 30, and valve 32. Cooking chamber comprises a cooking element, by way of example and not limitation comprising heating elements. Referring now to FIG. 2, in a currently envisioned alternative embodiment the present invention may be adapted for use with an existing cooking device, e.g. 46, such as by way of example and not limitation being adapted to replace a lid or cover for the existing cooking device. In this embodiment, cooking chamber 46 is used from existing cooking device 41 and hopper 42, stopper 44, conduit 30, and valve 32 are adapted for use with the existing cooking chamber 46. A supporting structure 48 may be used to prevent hopper 42 from losing its balance.

As shown more clearly in FIG. 2, stopper 44 may be a rotary valve 44 having receiver 45 as is well known in the prior art. Further, stopper 44 may comprise internally compartmentalized wheels, corkscrews, sliding doors, and the like.

Figure 3:
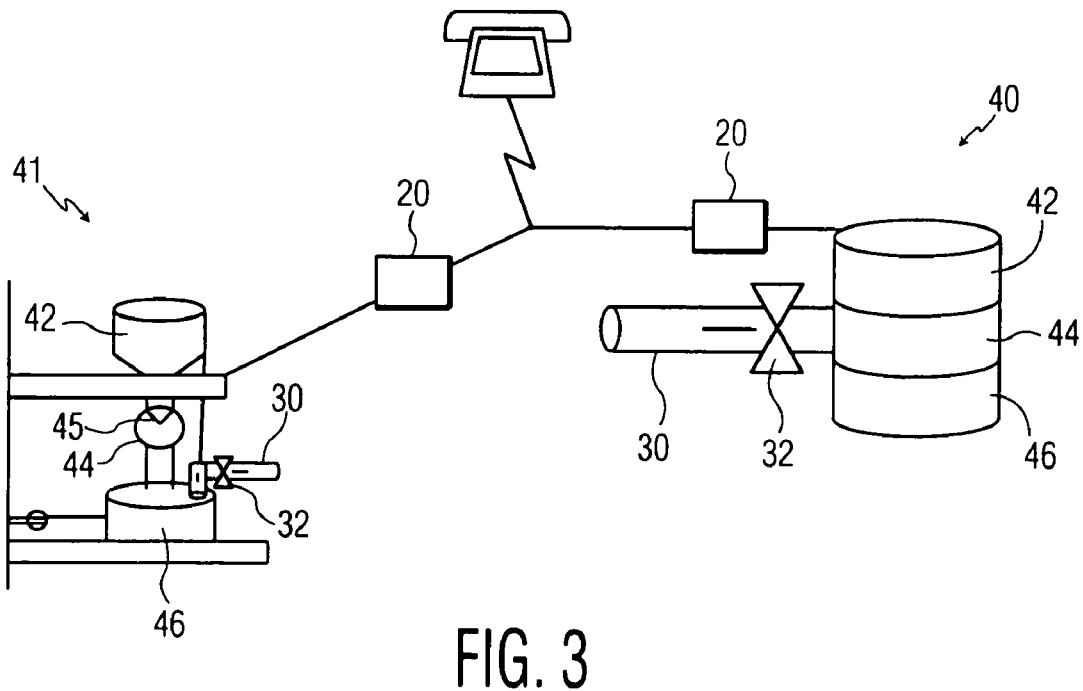
FIG. 3 is a schematic of an alternative exemplary system configuration of the present invention.

By way of further example and not limitation, referring now to FIG. 3, in a currently envisioned alternative embodiment the cooking device of the present invention may be connected to the user's phone line and thus be directly controlled by the user via a telephone without the need for residential home gateway server 10. In this embodiment, the user may use a touch tone telephone or cellular phone or the like and dial a phone number to gain access to the cooking device, controlling the cooking device such as via dual tone multi-frequency ("DTMF") signals, which will be readily understood to those of ordinary skills in the telephone control arts.

Referring back to FIG. 1, by way of further example and not limitation, cooking device 40,41 and its attached controllers 20 can have its own HTTP server implementation using HTTP server 112. HTTP server 112 will have a unique URL or IP address. In one exemplary implementation, HTTP server 112 may reside within controller 20. In alternative implementations, HTTP server 112 may be remote from cooking devices 40,41 and be accessed via the Internet 104. From a web browser such as at computer 110, the user can communicate with cooking device 40,41 directly via HTML pages, as will be readily understood to those of ordinary skill in the computer arts.

Figure 4:
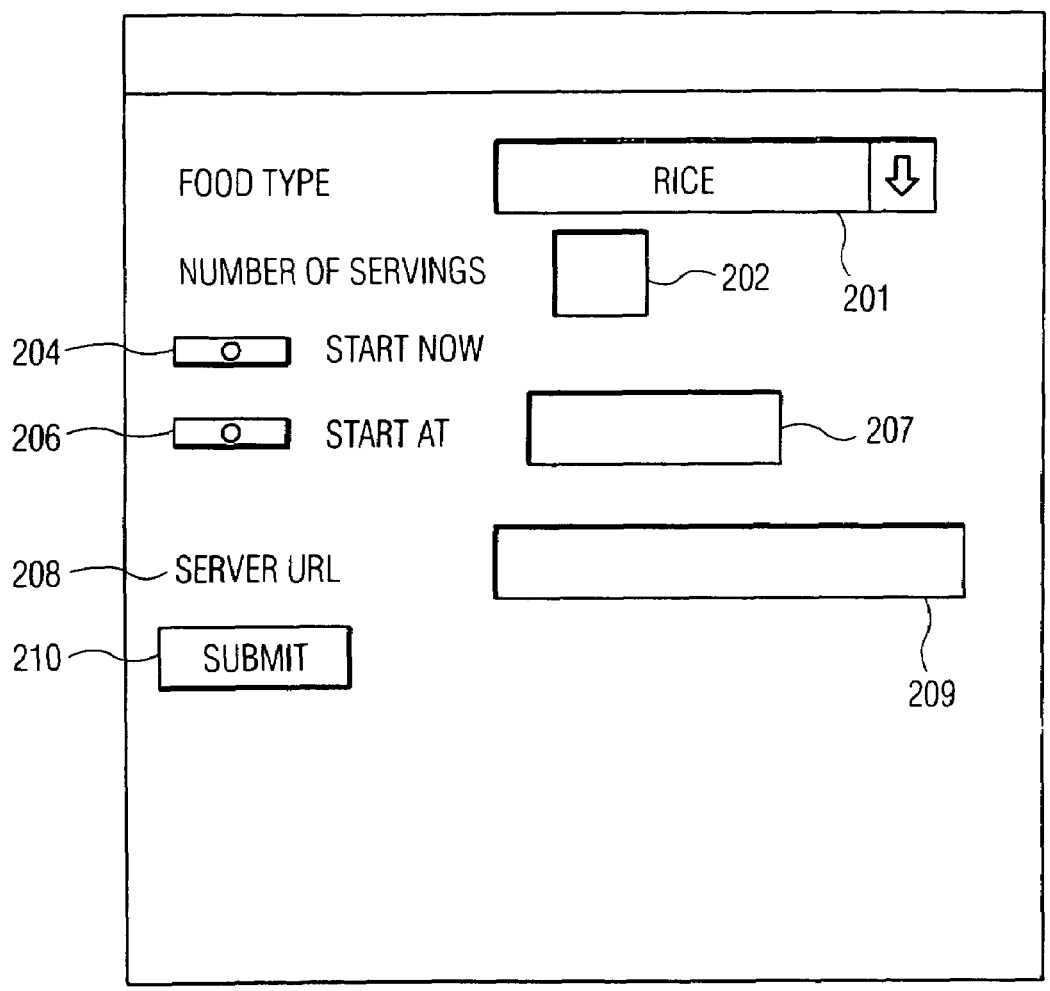
FIG. 4 is an exemplary representation of a user interface for remotely accessing the present invention.

In the operation of an exemplary embodiment, referring now to FIG. 1 and FIG. 4, a user may remotely program cooking device 40 such as by accessing an interface such as 200 through an Internet browser as that term will be readily familiar to those of ordinary skill in the computer arts. It is presumed for this illustrative example that hopper 44 already contains food material to be prepared. Alternatively, the user may access interface 200 through alternative means such as by way of a television remote to an television adapted to receive appliance programming, a hand held device such as a personal digital assistant having a wireless communications module, or the like.

Using interface 200, the user may select from one or more foods such as by menu 201 and instruct cooking device 40, 41 to prepare a number of servings of the selected food such as by entering data into 202. Further, the user can also instruct cooking device 40,41 to begin preparation immediately such as at 204 or specify a time in the future such as at 206, 207. When the user is satisfied that the cooking instructions are correct, the user may commence the instructions by submitting them, such as at 210. Cooking device 40,41 may automatically vary the start time by maintaining a database of cooking characteristics for each food of which it is aware. These cooking characteristics may further comprise amounts of liquids required for a given food to be prepared, amounts of liquids required per serving portion of that food, and heat ranges for cooking the food.

By way of further example and not limitation, a user may wish to have four servings of rice awaiting the user when the user arrives home. The user knows that the rice will take a certain amount of time to cook and the cooking device 40,41, via residential home gateway server 10, knows the cooking requirements for rice including time, heat, and liquid requirements. The user retrieves interface 200, selects "rice" from menu 201, fills in 202 with "4," and fills in box 207 with the time when the user wants the cooking to be started. The user additionally specifies the URL or the IP address of residential home gateway server 10 in menu item 209. These instructions are transmitted to an http server 112 accessible to residential home gateway server 10. In a preferred embodiment, the http server 112 may reside within the home gateway server 10. Further, in the currently preferred embodiment, the user may first establish a secure and private communication session, such as a secured http session, with residential home gateway server 10. The establishment of the secured session may be accomplished using an authorization and authentication module within residential home gateway server 10.

The user then transmits the required information to residential home gateway server 10, e.g. food selected, cooking times, and serving amounts. At the selected time, residential home gateway server 10 instructs controller 20 to feed the appropriate amount of food material, e.g. dry rice, from hopper 42 into cooking chamber 46, accomplished using stopper 44, as well as an appropriate amount of water from conduit 30 connected to a water source such as a home water line. When the rice and water are present in appropriate amounts in cooking chamber 46, controller 20 closes stopper 44, such as by bringing stopper 44 into a first, closed position that seals against both hopper 42 and cooking chamber 46, and closes conduit 30 using valve 32. When hopper 44 and conduit 30 are closed, controller 20 enables cooking chamber 46, e.g. turns on a heating element, for a time appropriate for the servings present in cooking chamber 46. At the end of that time interval, controller 20 disables cooking chamber 46, e.g. turns off the heating element. It is understood that certain embodiments of cooking chamber 46 may exist that have additional, automated controls such as humidity controls, content weight controls, or timers and that controller 20 may be adapted for use with such other additional, automated controls. It is understood that by using the information provided by the user, e.g., the content for the cooking and the number of servings, residential home gateway server 10 may be able to automatically calculate the adequate cooking time and the amount of liquid, e.g. water, needed and control the cooking device accordingly. Additionally, residential home gateway server 10 may be updated over the Internet 104 as to cooking characteristics of foods.

In a further contemplated alternative embodiment, a user may inform residential home gateway server 10 of a time at which the servings are expected to be cooked and residential home gateway server 10, through its stored data concerning cooking details such as cooking time, may independently derive a start time for cooking.

In addition to general utility, the present invention may be useful for the elderly or others with limited mobility as well as for individuals who wish to have foods prepared by the time they return home. Additionally, the present invention may be useful in industrial situations such as fast food establishments to allow customers to use the Internet 104, cellular telephony, or the like to call ahead for a specific order which can be processed automatically and be ready for that customer. By way of example and not limitation, in an industrial situation, e.g. a restaurant or a fast food store, the present invention may be used with a number of available cooking devices. When a customer places an order at the counter, the data entry terminal or register could link into the residential home gateway server 10 and instruct one of a plurality of idle cooking devices to prepare the requested number of servings. The residential home gateway server 10 could also have intelligence about the expected demand for food in an upcoming timeframe, i.e., lunch time, etc., and automatically start cooking food at various times of day based on experience of recent days.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A food preparation appliance, comprising:
    a. a residential home gateway server (10) operatively connected to a source of food preparation instructions via a first data communications interface, the server (10) comprising
        i. a memory, for storing predetermined food processing characteristics, and
        ii. a first communications interface;
    b. a controller (20) operatively connected to the server (10) by a second data communications interface;
    c. a hopper (42) for containing food to be prepared;
    d. a chamber (46) for being heated by a heating element;
    e. a stopper (44) in communication with the hopper (42) and the chamber (46), the stopper (44) operatively connected to and selectively controllable by the controller (20) to provide a predetermined portion of the food from the hopper (42) into the chamber (46);
    f. a conduit (30) for a liquid, the conduit (30) in fluid communication with the chamber (46);
    g. a valve (32) disposed intermediate the conduit (30) and the chamber (46) and operatively connected to and selectively controllable by the controller (20); and
    h. software, resident in the memory, to transform the food processing characteristics into a set of commands for the controller (20) based on the instructions.

2. The system of claim 1 further comprising a remote device for supplying the instructions to the residential home gateway server (10), the remote device comprising computers (110) connected to the Internet (104), personal digital assistants (120), cellular telephones, and remote control devices having access to the residential home gateway server (10) via local networks.

3. The system of claim 1 wherein the predetermined portion of the food of element (e) comprises single serving portions and multiple serving portions.

4. The system of claim 1 wherein the stopper (44) comprises rotary valves, internally compartmentalized wheels, sliding doors, and corkscrews.

5. The system of claim 1 wherein the stopper (44) is a rotatable wheel further comprising a receiver (45) for containing the predetermined portion of food of element (e).

6. The system of claim 1 wherein the stopper (44) has at least one position that seals the food in the hopper (42) from the chamber (46).

7. The system of claim 1 wherein the food comprises dry rice, dry grain cereals, dry soup, dry pasta, dry legumes, and foods reconstitutable with water.

8. The system of claim 1 wherein the receiver (45) and the conduit (30) are disposed to have at least one position in which food will be washed from receiver (45) into the chamber (46) by fluids from the conduit (30).

9. The system of claim 1 wherein the controller (20) comprises stepping motors, X-10 modules, timers, controllers (20) external to devices (40,41), and controllers (20) embedded in cooking devices (40,41).

10. The system of claim 1 wherein the controller (20) is a plurality of controllers (20).

11. The system of claim 1 wherein the controller (20) is remotely programmable.

12. The system of claim 1 wherein the residential home gateway server (10) is in communication with a server (112) to receive instructions to control controller (20), the instructions comprising food preparation data.

13. A food preparation appliance, comprising:
 a. a residential home gateway server (10) operatively connected to a source of preparation instructions via the communications interface, the server (10) comprising
  i. a memory, for storing predetermined food processing instructions, and
  ii. a communications interface;
 b. a controller (20) operatively connected to the server (10) by the communications interface;
 c. a hopper (42) for containing food to be prepared;
 d. a cover sealingly engagable onto a pre-existing preparation device having a controllable cooking element and a cooking chamber (46);
 e. a stopper (44) disposed between the hopper (42) and the cover, the stopper (44) operatively connected to and selectively controllable by the controller (20) to provide a predetermined portion of the food from the hopper (42) into the pre-existing device;
 f. a conduit (30) for a liquid, the conduit (30) in fluid communication with the cover;
 g. a valve (32) disposed intermediate the conduit (30) and the cover and operatively connected to and selectively controllable by the controller (20); and
 h. software, resident in the memory, to transform the food processing characteristics into a set of commands for the controller (20) based on the preparation instructions.

14. A food preparation appliance, comprising:
 a. a chamber (46);
 b. a controller (20) comprising a telephone system interface for being operative connection to a telephone system;
 c. a hopper (42) for containing food to be prepared;
 d. a stopper (44) in communication with the chamber (46) and the hopper (42), the stopper (44) operatively connected to and selectively controllable by the controller (20) to provide a predetermined portion of the food from the hopper (42) into the chamber (46);
 e. a conduit (30) for a liquid, the conduit (30) in communication with the chamber (46); and
 f. a valve (32) disposed intermediate the conduit (30) and the chamber (46) and operatively connected to and selectively controllable by the controller (20);
 g. whereby the controller (20) is responsive to commands entered using dual tone multi-frequency signaling to implement food preparation instructions.

15. A method of preparing food comprising:
 a. receiving data from a remote source (110,112,120), the data comprising an amount of desired servings of the food and a starting time for preparation of the food;
 b. determining the preparation characteristics of the food, the characteristics comprising an amount of liquid required for preparing the food and the length of preparation time;
 c. providing a portion of the food from a hopper (42) into a chamber (46) in a sufficient quantity to satisfy the desired servings by selectively engaging a stopper (44), disposed intermediate the hopper (42) and the chamber (46), until the sufficient quantity of food has been delivered from the hopper (42) into the chamber (46);
 d. providing liquids to the chamber (46) from a conduit (30) sufficient to satisfy the characteristics for the number of desired serving requirements; and
 e. engaging a heating element accessible to the chamber (46) for a time sufficient to satisfy the characteristics.

16. The method of claim 15 wherein the remote source (110,112,120) comprises remote television remote controllers, cellular phones interfacing via the Internet (104) to the residential home gateway server (10), cellular phones interfacing directly via a telephone interface to the residential home gateway server (10), cellular phones interfacing directly via a telephone interface to the controller (20), personal digital assistants interfacing via the Internet (104) to the residential home gateway server (10), personal digital assistants interfacing directly via a telephone interface to the controller (20), and devices accessing the residential home gateway server (10) via local area network.

17. The method of claim 15 wherein element (a) further comprises receiving data at a commercial food preparation and service location from a remote source (110,112,120), the data comprising an amount of desired servings of the food, a starting time for preparation of the food, and an identifier of the person ordering the food.

18. The method of claim 15 further comprising obtaining at least a portion of the characteristics from the Internet (104).

19. The method of claim 15 further comprising:
 f. obtaining measurements of predetermined food preparation device physical characteristics (40,41);
 g. using the measurements during preparation of the food.

20. The method of claim 21 further comprising using the measurements to provide information to the user, the information comprising status and alarms.

21. A food preparation appliance, comprising:
 a. means for containing food to be prepared;
 b. means for storing food processing characteristics for the food to be prepared;
 c. means for accepting instructions for a desired portion of the food to be prepared;
 d. means for communicating the instructions to a controller (20);
 e. means for selectively allowing a desired amount of the food to enter a means for preparing the desired amount of the food from the means for containing the food to be prepared; and
 f. means for providing a liquid into a chamber (46) according to the food processing characteristics for the food;
 g. whereby the controller (20) controls preparing of the desired portion of the food in the chamber (46) according to the food processing characteristics for the food.

22. A remotely controllable food preparation appliance for a home environment, the appliance comprising:
 a hopper for comprising a food ingredient;
 a heating chamber;
 a stopper between the chamber and the hopper for enabling an amount of the ingredient to enter the chamber;
 a conduit for a liquid;
 a valve between the conduit and the chamber for control of a volume of the liquid to enter the chamber;
 a controller coupled to the stopper and the valve for control of the amount and of the volume;
 an interface at the controller for enabling remote control of the controller.

23. The appliance of claim 22, wherein the interface enables remote control via a data network.

24. The appliance of claim 22, wherein the interface enables remote control via an infrared remote controller.

25. The appliance of claim 22 for cooking rice.

* * * * *